Figure 1:
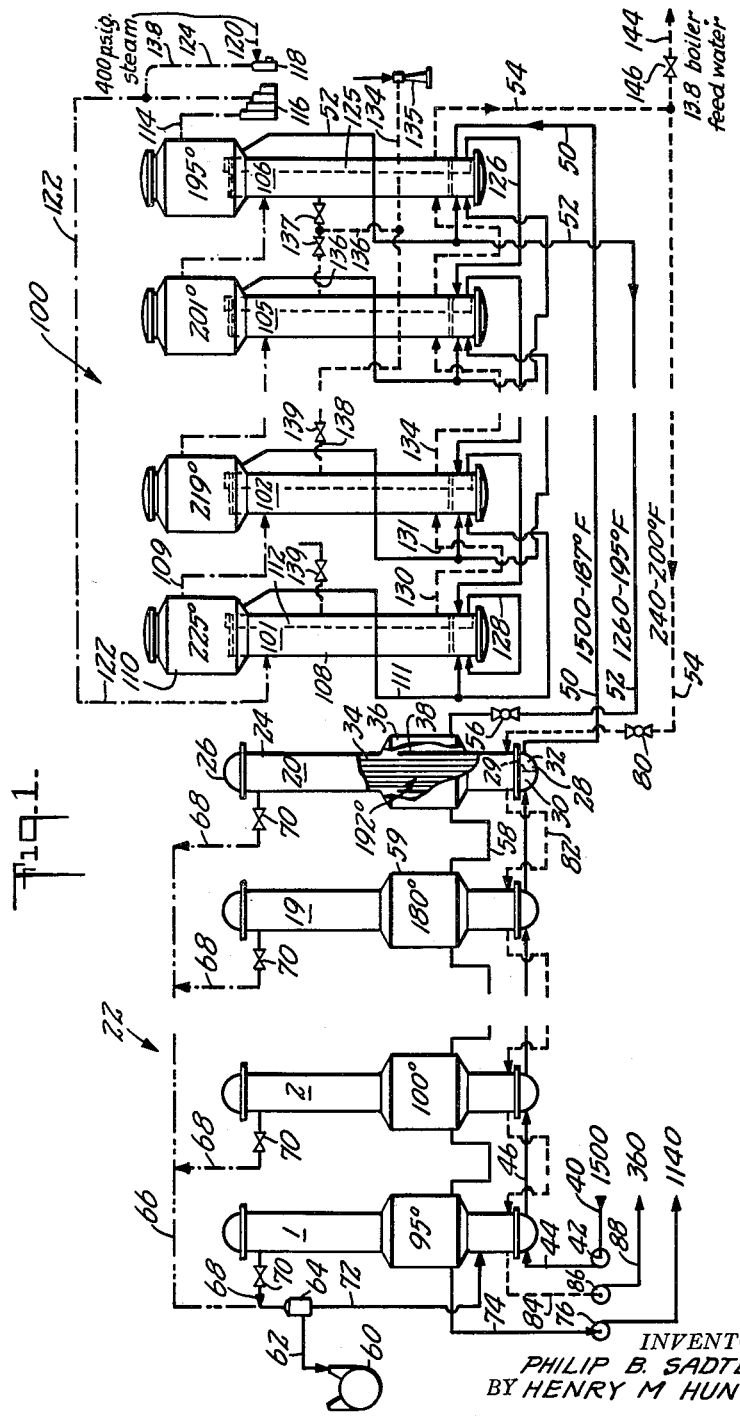

United States Patent Office 3,021,265
Patented Feb. 13, 1962

3,021,265
MULTIPLE EFFECT EVAPORATING SYSTEM
Philip B. Sadtler, South Norwalk, Conn., and Henry M. Hunter, Brooklyn, N.Y., assignors to Chicago Bridge & Iron Company, Chicago, Ill., a corporation of Illinois
Filed July 5, 1957, Ser. No. 670,198
3 Claims. (Cl. 202—174)

This invention relates to a novel method and apparatus for carrying out evaporating and/or distilling operations with exceptionally good thermal economy. The present invention is especially useful in connection with the economical production of distilled water from sea water and will be illustratively described as employed for this purpose. However, as the description proceeds it will become apparent that the invention can be used to advantage in many types of distilling and evaporating operations as well.

A number of commercially important desert and other excessively dry areas of the earth are located adjacent to or close to the sea. In such areas it is evident that there exists side-by-side an extensive need for fresh water for drinking, bathing and irrigation purposes and a potentially unlimited source of such water. The fulfillment of the urgent need for fresh water in such areas depends upon the development of a sufficiently economical process for converting sea water into fresh water. Moreover, there are many areas where extensive supplies of brackish waters or other impure waters are available which must be distilled or otherwise purified before they become potable.

Numerous processes have previously been proposed for the large scale evaporation of sea water and brackish waters to produce distilled water. Thus conventional multiple effect evaporators have been suggested. However, the relatively limited evaporating efficiency of such an installation in terms of pounds of fresh water produced per unit of heat input makes it uneconomic for many locations where a need for a large quantity of distilled water exists. Various chemical and ion exchange methods of converting salt water to fresh water have been considered, but have not so far proved practical for large scale use. It has also been proposed that recompression evaporators which have a significantly higher evaporating economy than multiple effect evaporators, be used. However even with the relatively high efficiency obtainable with a recompression evaporator the cost of the distilled water produced is undesirably high.

It is accordingly an object of the present invention to provide an improved process and apparatus for producing distilled water from sea water or other sources of impure water. It is another object of the invention to provide a water evaporation process having exceptionally good thermal economy. It is still another object of the invention to provide a process for evaporating aqueous liquids wherein an unusually large amount of water is evaporated per unit of heat input. Other objects of the invention will be in part obvious and in part pointed out hereafter.

As conducive to a clearer understanding of the present invention it may be pointed out that in the evaporation of sea water it is necessary to process several times the amount of potable water recovered as distillate in order to keep the concentration of salt relatively low and thereby prevent excessive scaling of the heating surfaces. The heat required to elevate this volume of raw water to its boiling point and the heat loss in the effluent brine, which must be discharged at a higher temperature than the raw feed water, makes it necessary to recover as much heat as possible from the effluent brine. In accordance with the present invention exceptionally efficient utilization of heat is achieved by providing an evaporating system comprising a multiple effect evaporator having a multi-stage evaporative pre-heater. Raw feed water for the multiple effect evaporator passes through a multi-stage pre-heater and the effluent brine from the evaporator passes through a multi-stage flash evaporation system so interconnected to the multi-stage pre-heater that the flash vapors from each stage of the flash evaporating system heat a corresponding stage of the pre-heater. Thus in the present system distilled water is formed not only at the temperature of the multiple effect evaporator but also in each pre-heater stage as the effluent brine is cooled by flashing at successively lower temperatures.

The combination of multiple effect evaporator and evaporative pre-heater described herein provides exceptional thermal economy. As pointed out in detail hereafter, an evaporating system of the type described herein is capable of producing of the order of 20–30 lbs. of distilled water per pound of steam. Those skilled in the art will recognize that this economy is substantially above that which can be achieved with conventional multiple effect, recompression or flash evaporators. The many objects and advantages of the present invention can best be understood and appreciated by reference to the accompanying drawings which illustrate diagrammatically an evaporating system that incorporates a preferred embodiment of the present invention.

Figure 2:
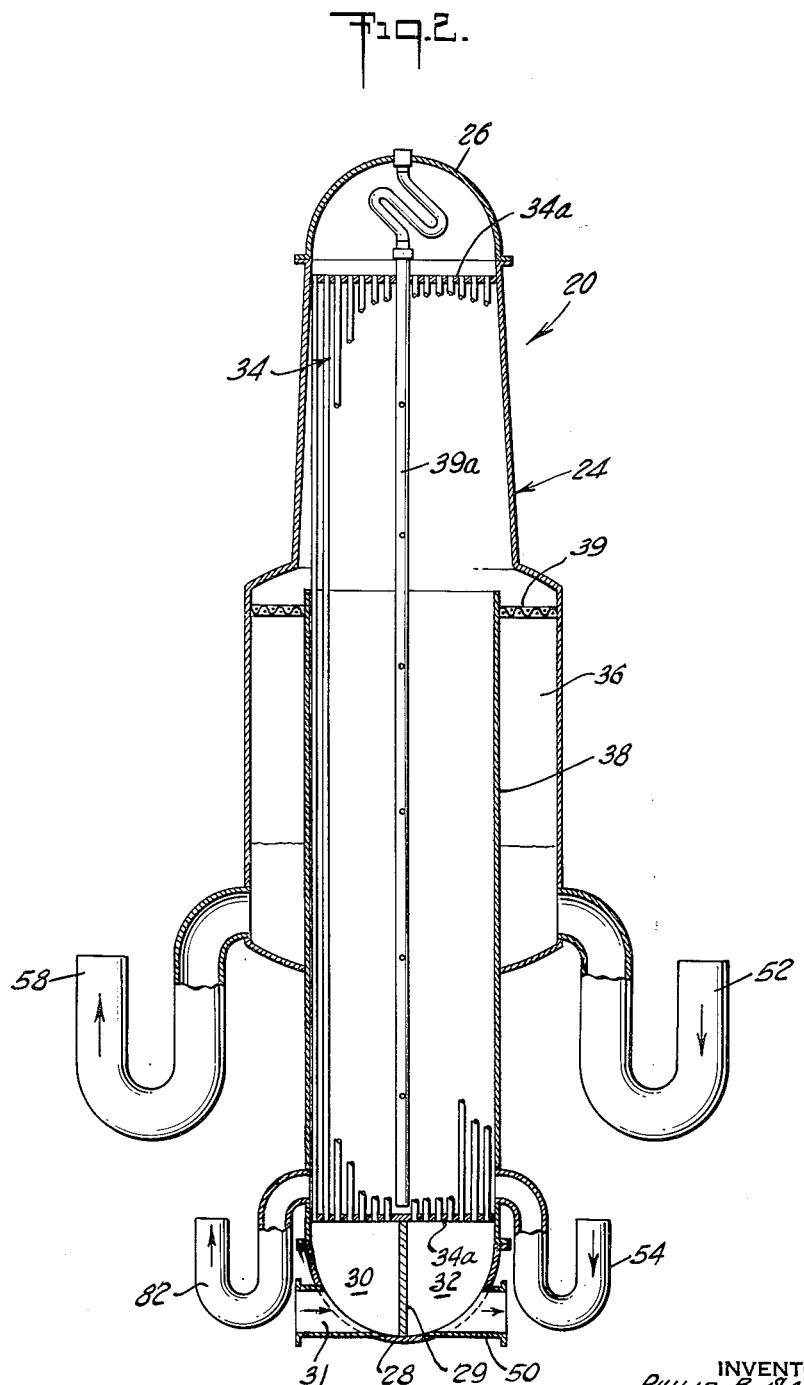

In the drawings:
FIGURE 1 is a flow diagram of the evaporating system as a whole, and
FIGURE 2 is a diagrammatic illustration on a greatly enlarged scale of one of the heating stages of the pre-heater broken away to show the interior construction of the heating stage.

Referring to the drawings and particularly FIGURE 1, the evaporating system there shown comprises in general a multiple effect evaporator generally designated 100 and having an evaporative preheater generally designated 22. The evaporator 100 is a sextuple effect evaporator of the parallel flow type with only the first, second, fifth and sixth effects being illustrated. These effects are numbered 101, 102, 105 and 106 respectively. The evaporative preheater 22 comprises some twenty stages, only four of which are illustrated. The illustrated stages are numbered 1, 2, 19 and 20 respectively.

The several stages of preheater 22 are similarly constructed and their construction can best be described by reference to FIGURE 2 of the drawings which is an illustration of stage 20 on an enlarged scale. Stage 20 comprises an elongated casing 24 having dished heads 26 and 28 at opposite ends thereof. The head 28 is divided by an internal partition 29 into an inlet compartment 30 and outlet compartment 32. The casing 24 contains a tube bundle 34 extending between and mounted in the tube sheets 34a and 34b at opposite ends of the casing in the usual manner. The liquor to be heated flows through a pipe 31 into inlet compartment 30, up through a first bank of tubes of tube bundle 34 to the head 26, thence down through a second bank of tubes in the tube bundle 34 to the outlet compartment 32, and out of the heater through a pipe 50.

The tubes of tube bundle 34 are externally heated by flash vapors. Casing 24 comprises a section of relatively large diameter forming a flash chamber 36. Heated brine from the multiple effect evaporator described hereafter flows through a pipe 52 into the flash chamber 36, and the pressure in the flash chamber is maintained at such a value that a portion of the brine flashes into vapor. The flash chamber is provided with a cylindrical baffle 38 that surrounds the tube bundle 34 and extends upwardly in the flash chamber to prevent the liquor from flowing into the tube bundle. The flash vapors flow through an annularly-shaped de-mister 39 which serves to remove entrained droplets of liquor therefrom and thence pass over the top of baffle 38 into contact with the tubes of tube bundle 34 and act as a heating medium for heating the liquor flowing through the tube bundle. The portion of the heated brine that does not flash into vapor in flash chamber 36 flows therefrom to the flash chamber of another stage of the preheater through a pipe 58 as will be described. Extending vertically through the center of tube bundle 34 there is a vent tube 39a by means of which non-condensible gases can be withdrawn from the tube bundle.

Referring now to the lower left-hand portion of FIGURE 1, the raw brine to be evaporated enters the evaporating system through a pipe 40 and is pumped by a pump 42 through pipe 44 to stage 1 of the preheater 22. Stage 1 like stage 20 contains a two-pass tubular heating element through which brine flows and is heated indirectly by flash vapors from the flash chamber of stage 1. The partially heated liquor then flows through pipe 46 to stage 2 of the preheater wherein it is further heated, thence successively through the heater stages 3 to 20 respectively. The approximate operating temperature of each stage is indicated on the flash chamber of that stage.

After leaving the last stage of the preheater (stage 20) the heated brine flows through pipe 50 to the multiple effect evaporator 100, which is largely of conventional construction, but incorporates certain novel features according to the present invention. Since the several effects of evaporator 100 are of similar construction, only one need be described in detail. Evaporator effect 101 comprises a vertical tube heating element 108 of conventional construction and a vapor-liquid disengaging chamber 110, commonly called a vapor body. Brine to be evaporated enters at the bottom of heating element 108 and flows up through tubes thereof. During its passage through the heating element it is heated by vapor surrounding the tubes. In the vapor body 110 the heated brine discharged from the upper ends of the tubes of heating element 108 partially flashes into vapor and the vapor and concentrated brine are separated. The vapors flow out of the vapor body 110 through a pipe 109 and are delivered to the next effect (effect 102) as the heating medium for that effect in the usual manner. Concentrated brine is transferred from vapor body 110 through pipe 111 to the bottom of effect 102 and flows upwardly through the tubes thereof.

The heating element 108 is provided with an integral pre-heater 112 of the type disclosed in Sadtler Patent 2,651,356. In accordance with the disclosure of this Sadtler patent (FIGURE 2), a portion of the tubes of heating element 108 are used for preheating purposes and are partitioned at the inlet and outlet ends thereof in such manner as to cause the liquor to be preheated to make two passes through the exchanger 108, after which the liquor is withdrawn from the exchanger. Each of the six effects 101–106 is provided with a preheater section of this type. The manner in which these preheater sections are interconnected with other portions of the evaporator will be described hereafter.

Vapors from the last effect 106 of evaporator 100 are compressed and returned as heating medium to the first effect 101. More particularly vapors from the vapor body of effect 106 flow through a pipe 114 to a vapor compressor 116 driven by a steam turbine 118 supplied with steam through a pipe 120. In the compressor 116 the vapors are compressed and flow through a pipe 122 to the vapor side of the heating element 108 of effect 101. The exhaust steam from turbine 118 flows through a pipe 124 into the pipe 122 and is returned to the first effect with the compressed vapors.

The brine that has been preheated in the evaporative preheater 22 as previously described flows through the pipe 50 to the preheater section 125 of the heating element of the last effect 106. In the preheater section 125 it makes two passes as previously described and is thereby further preheated, after which it leaves the lower end of effect 106 through a pipe 126 and flows to the preheater section of effect 105. In the preheater section of effect 105 the brine is further preheated and then flows successively in sequence through the preheater sections of the other effects of evaporator 100, in each of which effects it is still further preheated. Effluent brine from the preheater section 112 of effect 101 flows through a pipe 128 into the main bank of tubes of heating element 108 and upwardly therethrough to the vapor body 110. During its passage through heating element 108, the preheated brine is heated by condensation of the compressed vapors delivered to effect 101 through pipe 122. Condensate formed in the heating element 108 collects near the bottom thereof and flows out through a pipe 130, thence through a loop seal 131 in the pipe to the vapor space of the heating element of effect 102 wherein it is combined with condensate formed in effect 102. In like manner the accumulated condensate is transferred to successive effects wherein it combines with the condensate formed in each of the several effects. Effluent condensate from effect 106 is withdrawn through pipe 54 and is returned by this pipe to the evaporative preheater 22.

Referring again to evaporator effect 101, unevaporated brine from the vapor body 110 is conducted by a pipe 111 to the main bank of heating tubes in the heating element of evaporated effect 102 wherein it is further heated, and further evaporation takes place in the vapor body of effect 102. In accordance with the usual parallel flow multiple effect evaporator practice the concentrated brine is transferred successively in sequence to the several effects of the evaporator for further evaporation. The unevaporated brine from the last effect 106 of the evaporator 100 flows through pipe 52 to the evaporative preheater 22.

As in conventional multiple effect evaporators the several effects of the evaporator 100 are operated at successively lower pressures and temperatures. The approximate operating temperatures of the illustrated effects are indicated on the vapor body of each effect. The approximate operating temperatures of the 3rd and 4th effects are 213° and 207° respectively. It is thus evident that the first three effects operate above atmospheric pressure and the last three effects operate below atmospheric pressure. In order to achieve the desired sub-atmospheric pressure in the last three effects a vent gas system is provided comprising a vent gas header 134 and vent gas jet ejector 135. The vent gas header 134 is connected by branch pipes 136 with the vapor spaces of the heating elements of the last three effects and regulating valves 137 are provided in the branch pipes leading to these effects to regulate the pressure therein.

In the case of the first three effects, gases are vented from the vapor side of the heating element of each effect directly to the atmosphere. These three effects are provided with vent pipes 138 containing regulating valves 139 for this purpose.

As previously pointed out, the unevaporated brine from effect 106 is returned through pipe 52 to the evaporative preheater 22. More particularly the unevaporated brine passes through a pressure reducing valve 56 and then flows into the flash chamber 36 of stage 20 wherein a portion of the brine flashes into vapor which flows into contact with the tubes of tube bundle 34 as previously described. The unflashed brine flows through a loop seal 58 to the flash chamber 59 of stage 19 which is maintained at a lower pressure than chamber 36 to cause a further portion of the brine to be vaporized therein. As indicated in the drawing, the brine leaving flash chamber 59 flows successively through the flash chambers of the other stages of preheater 22. The unevaporated brine from the flash chamber of stage 1 is withdrawn through a pipe 74 and pumped by a pump 76 through a pipe 78 to a suitable point of disposal.

The flash chambers of the several stages of the preheater are maintained at successively lower pressures by a vacuum pump 60. The suction of vacuum pump 60 is connected through pipe 62 with a gas cooler 64 that is in turn connected to vacuum header 66 and through branch pipes 68 to the vapor spaces of the several stages of the preheater. Each of the branch pipes 68 is provided with a regulating valve 70. Vent gases are withdrawn near the top of the vapor space in each stage of the preheater through the branch pipes 68, and the pressures within the stages are maintained at the desired progressively decreasing values by adjustment of valves 70. The vent gases flow through pipe 66 to the cooler 64 wherein they are cooled. Condensate formed in cooler 64 is returned through pipe 72 to lower portion of the vapor space of stage 1.

Condensate returned from the multiple effect evaporator 100 through pipe 54 flows through a regulating valve 80 to the lower portion of the vapor space of stage 20, where it is combined with the condensate formed by condensation of the vapors that are flashed off in the flash chamber 36. The combined condensate flows through a loop seal 82 to the lower portion of the vapor space of stage 19 and thence successively through the stages of the preheater to stage 1. Since the several stages are maintained at progressively lower pressures, a small portion of the condensate flashes into vapor in each stage. However the condensate formed in each stage is combined with condensate transferred from the preceding stage and hence there is a net increase in the amount of condensate from stage to stage. The accumulated condensate in stage 1, which in this case is the desired product, flows out through a pipe 84 and is pumped by a product pump 86 through pipe 88 to a suitable storage point. It should be particularly noted that the preheater 22 operates not only to transfer heat from the effluent concentrated brine to the incoming raw feed brine, but also at the same time produces condensate in each stage and thereby increases substantially the yield of the desired product.

In order to point out more fully the nature of the present invention, an illustrative material balance for an evaporating system constructed in accordance with the present invention giving the approximate flows at various points in the system is indicated on the drawings. Referring particularly to the lower left end of the drawing, the illustrative material balance is based upon a raw brine feed rate of 1.5 million pounds per hour. The flow figures given on the drawings are expressed in thousands of pounds per hour and hence the feed brine flow is indicated as 1500.

As shown on the drawings, the feed brine is heated to about 187° F. in the evaporative preheater and then flows to the multiple effect evaporator 100. In the evaporator the brine is concentrated and distillate is formed. The effluent unevaporated brine from the evaporator 100 comprises about 1,260,000 pounds per hour and the distillate comprises about 240,000 pounds per hour. Both distillate and concentrated brine pass through the evaporative preheater 22 as described above to produce about 360,000 pounds per hour of distillate and about 1,140,000 pounds per hour of rejected concentrated brine.

As described above the vapors from the last effect of the multiple effect evaporator 100 are compressed and supplied as heating medium to the first effect by a turbine-driven compressor 116 shown at the right end of FIGURE 2. The present example is based on a steam turbine efficiency of about 55% and a vapor compressor efficiency of about 85%. Under these conditions approximately 13,800 pounds per hour of steam are required by the turbine 118 to effect the necessary compression of the vapors by compressor 116. As previously described, the exhaust steam from the turbine comprising this 13,800 pounds per hour is added to the compressed vapor used as heating medium in the first effect. A comparison of this amount of inlet steam with the product produced shows that approximately 26 lbs. of distilled water can be produced in a system of the present type per pound of steam fed to the system. As indicated at the lower right-hand portion of the drawing, 13,800 pounds per hour of condensate is withdrawn from pipe 54 through pipe 144 containing regulating valve 146 and used as boiler feed water for generating the steam used in turbine 118.

From the foregoing description it should be apparent that the present invention provides an evaporating system capable of achieving the several objectives set forth at the beginning of the present specification. By using the evaporative preheater 22, product distillate is produced not only at the operating temperature of the multiple-effect evaporator but also at the successively lower temperatures of the several stages of the preheater. By combining the multiple effect evaporator with the evaporative preheater in the manner described above, an evaporating system for brine or other impure waters is achieved which is capable of operating with an extraordinarily high thermal economy in terms of distilled water produced per pound of steam fed to the system.

It is of course to be understood that the foregoing description is illustrative only and that numerous changes can be made in the evaporating system illustratively disclosed. Thus the number of stages in the evaporative preheater 22 may be varied as desired and likewise the number of effects in the multiple effect evaporator may be varied. The operating temperatures and flow of material values given in the drawings are manifestly intended to be illustrative only. It will of course be understood that while the illustrated evaporator is of the parallel flow type, counter flow and mixed flow multiple effect evaporators of conventional types may also be used. The preheater sections of the multiple effect evaporator may be omitted if desired and the brine from preheater 22 fed directly to the first effect 101 or alternatively to succeeding effects for mixed flow operation. The number of passes made by the brine through the various heating elements, i.e. the heating elements of the evaporative preheater, the preheaters of the evaporator effects, and the main bank of tubes in the evaporator effects, can be varied as desired. While long tube vertical single-pass evaporator heating elements are indicated in the drawing, any conventional type of evaporator heating arrangement may be used. Other modifications of the illustrated system that fall within the scope of the present invention as defined in the appended claims will be apparent to those skilled in the art.

We claim:

1. An evaporating system comprising in combination a multi-stage heater for heating a liquor to be evaporated, each stage of said heater having a liquor side through which the liquor to be evaporated flows and a vapor side wherein vapor is condensed to supply heat to said liquor, a flash chamber communicating with the vapor side of each stage of said heater, said flash chambers being interconnected for series flow of heated liquor therethrough, a multiple effect evaporator comprising a first effect, a last effect, at least one intermediate effect and transfer pipes for transferring liquor to be evaporated from each effect except the last effect to a successive effect of said evaporator, a compressor connected to receive vapor from said last effect and deliver it at higher pressure as heating medium to said first effect, a first conduit interconnecting the last stage of said heater to said evaporator to conduct heated liquor from said heater to said evaporator, and a second conduit interconnecting said evaporator and the flash chamber communicating with the last stage of said heater for conducting concentrated liquor from said evaporator to said last-named flash chamber.

2. An evaporating system comprising in combination a multi-stage heater for heating a liquor to be evaporated, each stage of said heater having a liquor side through which the liquor to be evaporated flows and a vapor side wherein vapor is condensed to supply heat to said liquor, a flash chamber communicating with the vapor side of each stage of said heater, said flash chambers being interconnected for series flow of heated liquor therethrough, a multiple effect evaporator comprising a first effect, a last effect, at least one intermediate effect and transfer pipes for transferring liquor to be evaporated from each effect except the last effect to a successive effect of said evaporator, a compressor connected to receive vapor from said last effect and deliver it at higher pressure as heating medium to said first effect, a first conduit connected to receive heated liquor from the last stage of said heater and deliver it to said first effect, and a second conduit connected to receive concentrated liquor from said last effect and to deliver it to the flash chamber that communicates with the last stage of said heater.

3. An evaporating system comprising in combination a multi-stage heater for heating a liquor to be evaporated, each stage of said heater having a liquor side through which the liquor to be evaporated flows and a vapor side wherein vapor is condensed to supply heat to said liquor, a flash chamber communicating with the vapor side of each stage of said heater, said flash chambers being interconnected for series flow of heated liquor therethrough, a multiple effect evaporator comprising a first effect, a last effect, at least one intermediate effect and transfer pipes for transferring liquor to be evaporated from each effect except the last effect to a successive effect of said evaporator, a compressor connected to receive vapor from said last effect and deliver it as higher pressure as heating medium to said first effect, a first conduit connected to receive heated liquor from the last stage of said heater and deliver it to said first effect, a second conduit connected to receive concentrated liquor from said last effect and to deliver it to the flash chamber that communicates with the last stage of said heater, and a third conduit connected to receive condensate from the last effect of said evaporator and conduct it to the vapor side of the last stage of said heater.

References Cited in the file of this patent

UNITED STATES PATENTS

| | | |
|---|---|---|
| 643,702 | Waterhouse | Feb. 20, 1900 |
| 713,297 | Goss | Nov. 11, 1902 |
| 713,298 | Goss | Nov. 11, 1902 |
| 2,379,519 | Hall | July 3, 1945 |
| 2,440,173 | Henszey | Apr. 20, 1948 |
| 2,651,356 | Sadtler | Sept. 8, 1953 |
| 2,744,571 | Mair | May 8, 1956 |
| 2,759,882 | Worthen et al. | Aug. 21, 1956 |
| 2,908,618 | Bethon | Oct. 13, 1959 |
| 2,979,442 | Badger | Apr. 11, 1961 |

FOREIGN PATENTS

| | | |
|---|---|---|
| 16,035 | Great Britain | 1897 |
| 458,152 | Great Britain | Dec. 14, 1936 |

OTHER REFERENCES

Badger: "Chemical and Metallurgical Engineering," vol. 28, No. 2, Jan. 10, 1923 (pp. 73–78, especially pp. 75 and 76 relied on).